US012755216B2

(12) United States Patent
Agarwal et al.

(10) Patent No.: US 12,755,216 B2
(45) Date of Patent: Oct. 6, 2026

(54) GREENHOUSE GAS EMISSIONS DATA COLLECTION AND CROSS-VALIDATION SYSTEM

(71) Applicant: Symboticware Inc., Sudbury (CA)

(72) Inventors: Ashutosh Agarwal, Lisle, IL (US); Bashir Chalabi, Toronto (CA)

(73) Assignee: Symboticware Inc., Sudbury (CA)

( * ) Notice: Subject to any disclaimer, the term of this patent is extended or adjusted under 35 U.S.C. 154(b) by 625 days.

(21) Appl. No.: 18/234,051

(22) Filed: Aug. 15, 2023

(65) Prior Publication Data

US 2024/0062122 A1 Feb. 22, 2024

Related U.S. Application Data

(60) Provisional application No. 63/399,481, filed on Aug. 19, 2022.

(51) Int. Cl.

| | |
|---|---|
| ***G06Q 10/04*** | (2023.01) |
| ***G06N 3/0442*** | (2023.01) |
| ***G06Q 50/02*** | (2012.01) |
| ***G07C 5/00*** | (2006.01) |

(52) U.S. Cl.

CPC ........... *G06Q 10/04* (2013.01); *G06N 3/0442* (2023.01); *G06Q 50/02* (2013.01); *G07C 5/008* (2013.01)

(58) Field of Classification Search

CPC ...... G06Q 10/04; G06Q 50/02; G06N 3/0442; G07C 5/008

See application file for complete search history.

(56) References Cited

U.S. PATENT DOCUMENTS

| | | | | |
|---|---|---|---|---|
| 11,892,836 | B2 * | 2/2024 | Whitfield, Jr. | G05D 1/0027 |
| 12,321,144 | B2 * | 6/2025 | Cella | G06Q 10/04 |
| 2006/0273756 | A1 * | 12/2006 | Bowling | B60L 53/68 320/107 |
| 2009/0300422 | A1 * | 12/2009 | Grichnik | G05B 23/024 714/E11.178 |
| 2017/0161621 | A1 * | 6/2017 | Goldstein | G06F 11/0721 |
| 2021/0089938 | A1 * | 3/2021 | Ariannezhad | G08G 1/096775 |
| 2022/0161816 | A1 * | 5/2022 | Gyllenhammar | B60W 60/001 |

(Continued)

*Primary Examiner* — Gertrude Arthur Jeanglaude

(74) *Attorney, Agent, or Firm* — Preston Smirman; SMIRMAN IP LAW, PLLC

(57) ABSTRACT

A system for greenhouse gas emissions data collection and cross-validation, including vehicle tailpipe emissions sensor devices, mine site environmental emission sensor devices, distributed computing data interfaces installed on light- and heavy-duty vehicles, wireless connection controllers integrated with the data interface, and remote cloud data servers. The system also includes software components that include a distributed computing-level cross-validation AI algorithm. The system also includes data acquisition modules, data analysis modules and sensor data processing modules. The particular acceptability threshold is calculated either in real-time and continuously or at predetermined time intervals. Further, the emission data is benchmarked against an acceptability threshold calculated from the emissions data from similar vehicles continuously accumulated using similar processes at the same mine site and globally. When data inconsistency or insufficiency is revealed, the algorithm provides auto-correction and, depending on severity, sends real-time service alerts to the user.

9 Claims, 4 Drawing Sheets

(56) References Cited

U.S. PATENT DOCUMENTS

| | | | | |
|---|---|---|---|---|
| 2024/0062122 | A1* | 2/2024 | Agarwal | G07C 5/008 |
| 2024/0067038 | A1* | 2/2024 | Dowling | G01C 21/3469 |
| 2024/0094016 | A1* | 3/2024 | Russo | G01C 21/3469 |
| 2024/0202627 | A1* | 6/2024 | Organ | G06Q 10/06315 |

* cited by examiner

GREENHOUSE GAS EMISSIONS DATA COLLECTION AND CROSS-VALIDATION SYSTEM

CROSS-REFERENCE TO RELATED APPLICATION

The instant application claims priority to U.S. Provisional Patent Application Ser. No. 63/399,481, filed Aug. 19, 2022, pending, the entire specification of which is expressly incorporated herein by reference.

FIELD OF THE INVENTION

This invention relates to a system for greenhouse gas emissions data collection and cross-validation and is more particularly directed to an artificial intelligence-enabled process for greenhouse gas emissions data collection and cross-validation in the underground mining environments.

BACKGROUND OF THE INVENTION

The mining industry, which accounts for 4 to 7% of the global greenhouse gas emissions, lags behind other sectors in the emissions reporting while experiencing pressure from the market, regulators, and other stakeholders to ensure transparency and comparability of data. Scope 1 emissions of the road- and off-road vehicles are significant. Transportation and mobile equipment together account for 56% of carbon monoxide and 51% of nitrogen oxides emissions. The measurement of these emissions is difficult and, in many cases, untransparent because of limiting companies' access to data and data-enabled methods of carbon footprint optimization. At the same time, sustainability rating agencies responsible for building investors oriented environmental, social and governance (ESG) ratings of mining companies struggle with the absence of comparable data because of the lack of consistent reporting standards.

Currently, 80% of significant mining companies disclose emissions. Conventionally, the disclosure is based on mathematical calculations from the equation:

$$\text{Emissions}=\Sigma\text{engine hours}\times\text{emissions rate}$$

The emissions rate is assessed using one of the emissions equivalencies calculators converting the fuel consumption into emissions intensity. Factors used for the conversion are provided by various regulators and industry organizations. In rare cases, the reporting is supplemented with direct measurements by installing tailpipe sensors and technicians' manual collection of data. At the same time, many mining companies are renouncing any solution to the problem. The share of major mining companies that disclose their emissions is 5.6% less than the industrial average. 92% of junior mining companies do not report their emissions. The rating agencies rely on ESG (environmental, social and governance) assessments on the data provided by the mining companies. In some cases, the data is verified by one of the accredited verifiers, which is a costly service for the companies.

The emissions data reporting based on calculations is unreliable. Firstly, it ignores the off-road operating conditions prevalent in the mining industry, with mixed engine load cycles, varied loads, and specifics of driver behaviors, which cause deviations from the outlined by OEMs and other information providers' specifications and references. Secondly, there are no standards—even the conversion factors differ (i.e., from 2.3 to 2.7 kg of $CO_2$ per liter of diesel, depending on the source). Moreover, the over-reliance on mathematical calculations prevents mining companies from making informed decisions regarding carbon footprint optimization.

The absence of data cross-validation in automated collection systems makes the reporting unreliable due to the risk of equipment failure or human error.

SUMMARY OF THE INVENTION

The present invention describes a system for greenhouse gas emissions data collection and cross-validation. The greenhouse gas emissions at mine sites are to be accurately reported and monitored in real-time in order to decide timely corrective measures. The system mainly comprises of a plurality of vehicle tailpipe emissions sensor devices, a plurality of mine site environmental emission sensor devices, a plurality of distributed computing data interfaces installed on light- and heavy-duty vehicles, a plurality of wireless connection controllers integrated with above mention data interface, and remote cloud data server. The system also comprises of software components that include the distributed computing-level cross-validation AI algorithm. The working of the present system includes at least one data acquisition module, data analysis module and the sensor data processing module. The data acquisition module includes the pre collected training data (e.g., normal data) and the time series data but with some anomalies in the data. The data analysis module and the sensor data processing module use AI algorithm. The data analysis module includes pre-processing, model building and training, model evaluation and anomaly detection. In the data analysis module, the particular acceptability threshold is calculated. The particular acceptability threshold is calculated either in real-time and continuously or at predetermined time intervals. Further, the emission data is benchmarked against the acceptability threshold based on the emissions data from similar vehicles continuously accumulated using similar process at the same mine site and globally. When data inconsistency or insufficiency is revealed, the algorithm provides auto-correction and, depending on severity sends real-time service alerts to the user.

BRIEF DESCRIPTION OF THE DRAWINGS

The drawings described herein are for illustrative purposes only of selected embodiments and not all possible implementations, and are not intended to limit the scope of the present disclosure.

The invention will be explained in more detail in the following text, using exemplary embodiments and in conjunction with the drawing, in which.

DETAILED DESCRIPTION OF THE INVENTION

Figure 1:
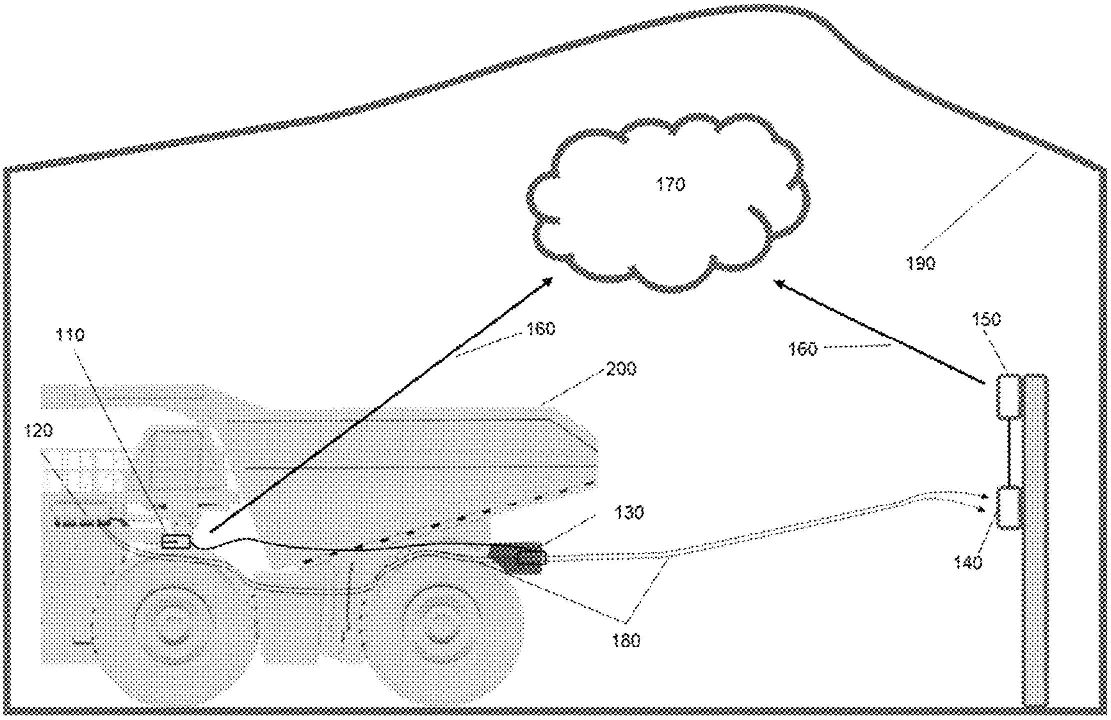
FIG. 1 describes the system of greenhouse gas emission data collection in the underground mining environment and processing in the cloud server.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" be used in a permissive sense (i.e., meaning having the potential to), rather than the mandatory sense, (i.e., meaning must). Further, the words "a" or "an" mean "at least one" and the word "plurality" means "one or more" unless otherwise mentioned. Furthermore, the terminology and phraseology used herein are solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not to exclude other additives, components, integers or steps. Likewise, the term "comprising" is considered synonymous with the terms "including" or "containing" for applicable legal purposes. Any discussion of documents, acts, materials, devices, articles and the like are included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising," it is understood that we also contemplate the same composition, element or group of elements with transitional phrases "consisting of," "consisting," "selected from the group of consisting of, "including," or "is" preceding the recitation of the composition, element or group of elements and vice versa.

The present invention is described hereinafter by various embodiments with reference to the accompanying drawings, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

The present invention describes a system for greenhouse gas emissions data collection and cross-validation. The greenhouse gas emissions at mine sites are to be accurately reported and monitored in real-time in order to decide timely corrective measures. The greenhouse gases such as carbon dioxide and carbon monoxide amongst others are detected and monitored by the present invention. The system mainly comprises of a plurality of vehicle tailpipe emissions sensor devices, plurality of mine site environmental emission sensor devices, a plurality of distributed computing data interfaces installed on light- and heavy-duty vehicles, a plurality of wireless connection controllers or data transmissions integrated with above mentioned data interface, and remote cloud data server.

FIG. 1 of the present invention describes the system of the greenhouse gas data collection in the underground mining environment and processing in the cloud server. According to one of the embodiments, the system 100 for greenhouse gas emissions data collection and cross-validation includes a vehicle 200 in an underground mining site 190. An onboard data interface 110 is installed on the vehicle 200. An emission sensor 130 is placed at the tailpipe of the vehicle 200. The flow of exhaust gases from the engine 120 tailpipe emissions sensor 130 of the vehicle 200 is depicted by the lines 180. The environmental emissions sensor 140 and the onsite data interface 150 are placed in the underground mine site 190. Through wireless data transmission 160, the data is transmitted to the cloud data server 170 from the vehicle on board data interface 110 and the onsite data interface 150. The system further comprises of software components that include the distributed computing-level cross-validation AI algorithm.

Figure 2:
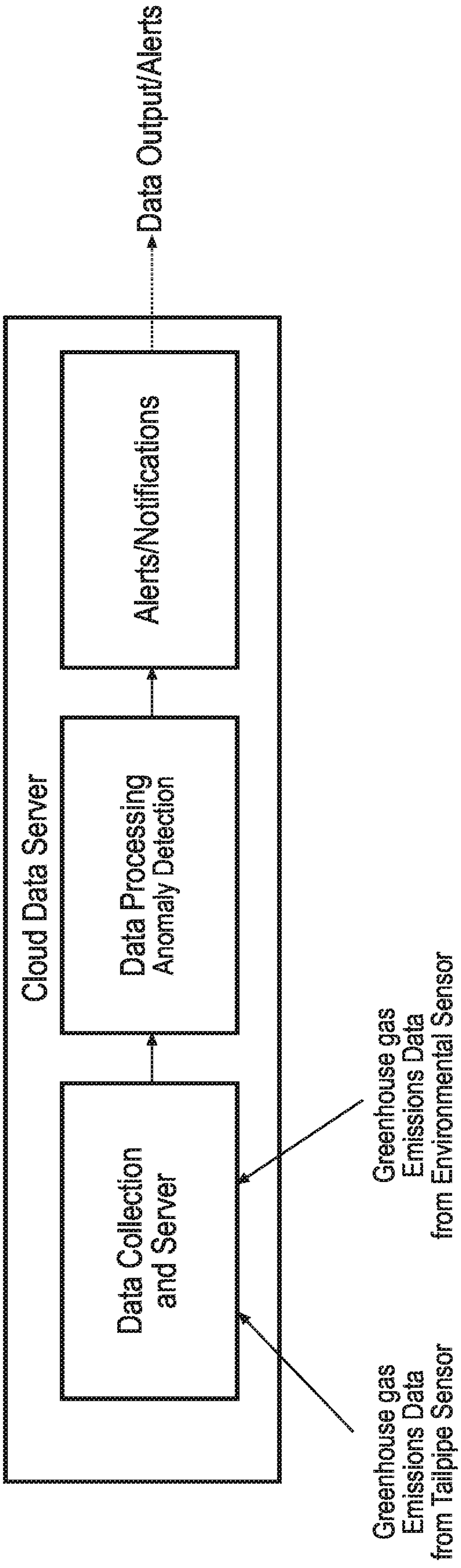
FIG. 2 is a general flow chart of the process of working of the system for greenhouse gas emissions data cross-validation in an embodiment of the invention.

As described in FIG. 2 of the present invention, the process of working of the present invention primarily comprises of data collection and storage stage, data processing stage and generating alerts or notifications if required as data outputs. In the data collection stage, the tailpipe emissions sensors 130 are installed on the plurality of vehicles 200 working in underground sites 190. The stationary sensors or the environmental emissions sensor 140 are installed at the mine site to collect real-time emissions data. The data is transmitted to the cloud data servers (170) or computing devices using wireless data transmission 160 such as Bluetooth, Satellite of Wi-Fi. The computing device is remotely placed. After being received at the computing devices, the data gets cross-validated through the AI algorithm.

Figure 3:
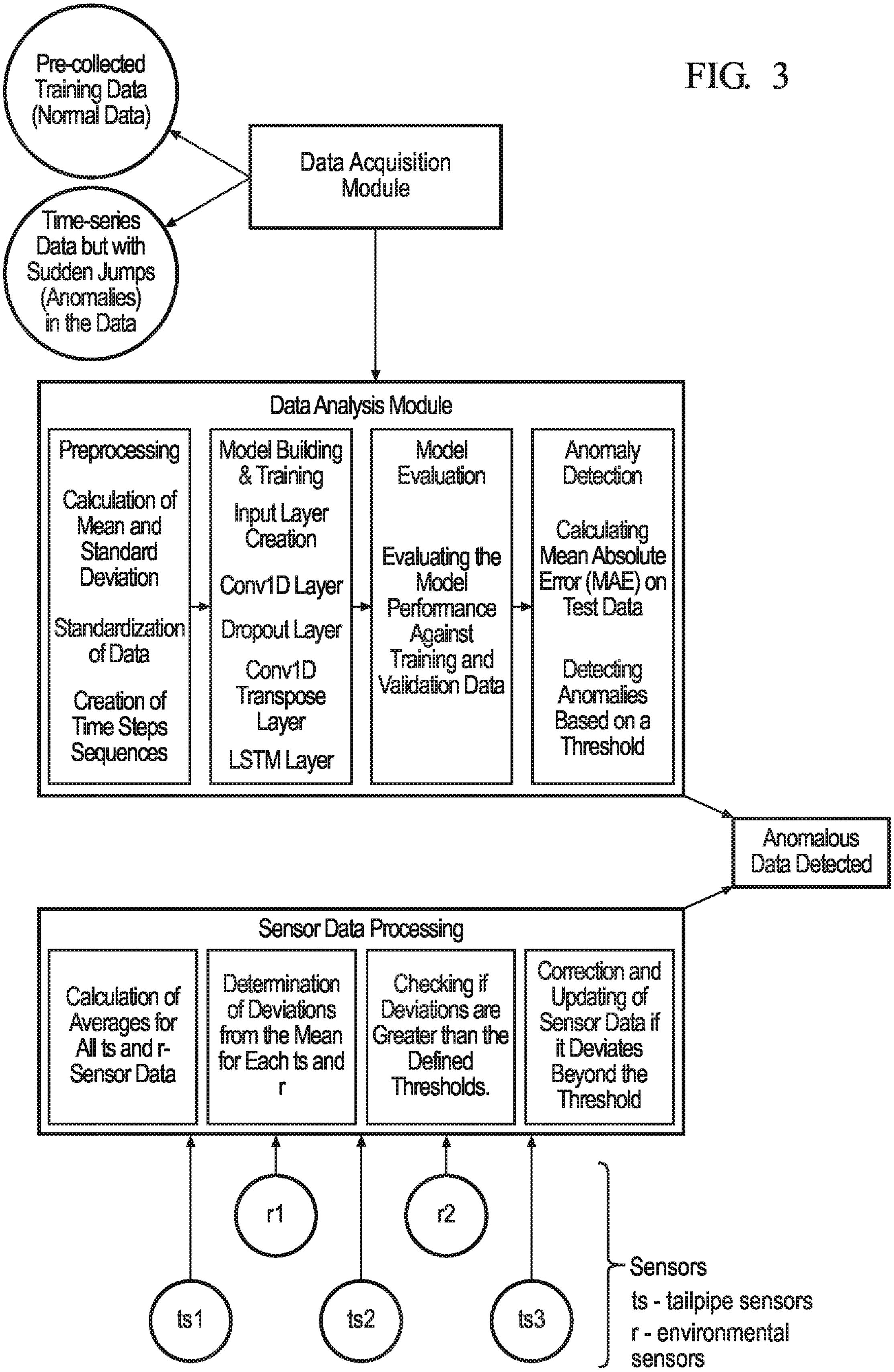
FIG. 3 is the detailed flow chart of the process of working of the system for greenhouse gas emissions data cross-validation in an embodiment of the invention.

As described in FIG. 3 of the present invention, the working the present system includes the data acquisition module, data analysis module and the sensor data processing module. The data acquisition module includes the pre collected training data (e.g., normal data) and the time series data but with some anomalies in the data. The data analysis module and the sensor data processing module use AI algorithm. The data analysis module includes pre-processing, model building and training, model evaluation and anomaly detection. In the data analysis module, the particular acceptability threshold is calculated. The acceptability threshold is calculated at predetermined intervals such as five minute intervals, selected to avoid network infrastructure overload. According to one of the working examples of the present invention, the process starts with collecting the greenhouse gas emission data from the tailpipe emissions sensors 130 as well as the environmental emissions sensors 140 over a period of 14 days in regular five-minute intervals to use as training data. This data is then processed in a neural network consisting of two layers namely an autoencoder and Long Short-Term Memory (LSTM). The autoencoder is used for the reconstruction of data and the removal of anomalies. The Long Short-Term Memory (LSTM) is required to enable the system to work with the larger dataset. In a use-case scenario, an organization with a fleet of vehicles notices an unusual gas emission spike. They feed their emission data from the tailpipe emissions sensors 130 as well as the environmental emissions sensors 140 into the autoencoder within their machine learning model. The autoencoder, by mimicking input data, reconstructs the “normal” emissions pattern. Deviations from this pattern, such as the observed spike, are then flagged as anomalies. To handle the large dataset, the Long Short-Term Memory (LSTM) component is employed. The LSTM, a recurrent neural network type, processes the substantial emissions data and discerns patterns over time, crucial for analyzing inherently time-dependent emission data. In summary, the autoencoder identifies anomalies, while the Long Short-Term Memory (LSTM) component manages large, temporally dependent datasets, working harmoniously to monitor emissions effectively. The mean absolute error (MAE) of the training data is found using the equation:

MAE=*np*.mean(*np*.abs(*X*_train_pred−*X*_train), axis=1).

The MAE is then identified as the acceptability threshold: threshold=np.max(MAE).

During the sensor data processing stage of the cross validation process, the tailpipe emission sensors 130 that are installed on the plurality of vehicles collect data on four instances in four regular intervals (step #1). The data collected on each tailpipe emission sensor 130 and each environmental emission sensor 140 gets averaged separately for each sensor (step #2), and then the averages calculated in step #2 are averaged relative to each other (step #3). The calculation result of step #3 is then deducted from the calculation results of step #2, separately for each sensor. The difference between two averages (the “deviation”) is then benchmarked against the particular/special acceptability threshold as calculated in phase one. When, for a particular sensor, the difference exceeds the acceptability threshold, the respective sensor and the vehicle on which it is installed are indicated by the algorithm as at-risk and red-flagged. Corrective measures, including taking equipment for maintenance or feedback to equipment operator, can then be carried out by the individual/equipment operator in charge at the mine stie or at a remote location. This situation is defined in the equation: test_mae_loss=np.mean(np.abs(x test pred−x test), axis=1); anomalies=test_mae_loss>threshold. The site-level data is then transmitted to the virtual cloud server.

Figure 4:
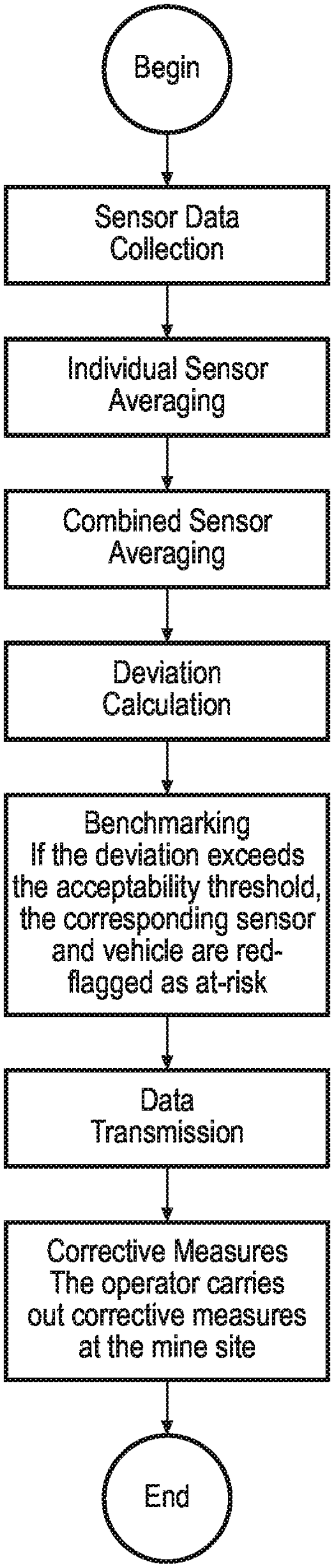
FIG. 4 is a flow chart of the entire collection and processing process in the underground mining environment.

FIG. 4 of the present invention describes the entire collection and processing process in the underground mining environment. For underground deployments, the data from all vehicles on the site is transmitted to one of the distributed computing devices on the site and gets cross-validated against the data from site-level conventional environmental emissions sensors using the above-described AI algorithm. The emission data is benchmarked against the acceptability threshold based on the data contained in the warehouse—a pool of emissions data from similar vehicles continuously accumulated using similar process at the same mine site and globally. When data inconsistency or insufficiency is revealed, the algorithm provides auto-correction and, depending on severity sends real-time service alerts to the equipment operator.

In the present invention, in the data collection phase, the critical aspect of the process includes the use of real-time data validation and edge processing, aimed to increase accuracy and transparency, and reduce data transmission costs compared to conventional methods that transmit raw data or require manual data collection and subsequent validation. The present invention can be deployed as a part of a telemetry system at mine sites to collect and process greenhouse gas emissions data and optimize the emissions on the fleet level. The present invention will also benefit other industries that use vehicles in the enclosed spaces (e.g., construction, transportation and/or the like).

By way of a non-limiting example, an exemplary code system for practicing one or more embodiments of the present invention is set forth in the TABLE below:

TABLE

| Code | Description |
|---|---|
| import numpy as np<br>import pandas as pd<br>from tensorflow import keras<br>from tensorflow.keras import layers<br>from matplotlib import pyplot as plt | Upload of basic processing packages |
| master__url__root = “https://github.com/numenta/NAB/raw/master/data/”<br>df__small__noise__url__suffix =<br>“artificialNoAnomaly/art__daily__small__noise.csv”<br>df__small__noise__url = master__url__root + df__small__noise__url__suffix<br>df__small__noise = pd.read__csv(<br>  df__small__noise__url, parse__dates=True, index__col=“timestamp”<br>)<br>df__daily__jumpsup__url__suffix =<br>“artificialWithAnomaly/art__daily__jumpsup.csv”<br>df__daily__jumpsup__url = master__url__root +<br>df__daily__jumpsup__url__suffix<br>df__daily__jumpsup = pd.read__csv(<br>  df__daily__jumpsup__url, parse__dates=True, index__col=“timestamp”<br>)<br>print(df__small__noise.head( ))<br>print(df__daily__jumpsup.head( ))<br>fig, ax = plt.subplots( )<br>df__small__noise.plot(legend=False, ax=ax)<br>plt.show( )<br>fig, ax = plt.subplots( )<br>df__daily__jumpsup.plot(legend=False, ax=ax)<br>plt.show( )<br>training__mean = df__small__noise.mean( )<br>training__std = df__small__noise.std( )<br>df__training__value = (df__small__noise − training__mean) / training__std<br>print(“Number of changes in training data:”, len(df__training__value)) | Upload of sample dataset (in the actual implementation will use data from sensors) and preparation of data through min-max normalization and imputation of the missing due to the negative externalities and technical failures data |

TABLE-continued

| Code | Description |
|---|---|
| TIME__STEPS = 288<br>def create__sequences(values, time__steps=TIME__STEPS):<br>output = [ ]<br>for i in range(len(values) − time__steps + 1):<br>output.append(values[i : (i + time__steps)])<br>return np.stack(output)<br>x__train = create__sequences(df__training__value.values)<br>print(“Input layer: ”, x__train.shape)<br>model = keras.Sequential(<br>[<br>layers.Input(shape=(x__train.shape[1], x__train.shape[2])),<br>layers.Conv1D(<br>filters=32, kernel__size=7, padding=“same”, strides=2, activation=“relu”<br>),<br>layers.Dropout(rate=0.2),<br>layers.Conv1D(<br>filters=16, kernel__size=7, padding=“same”, strides=2, activation=“relu”<br>),<br>layers.Conv1DTranspose(<br>filters=16, kernel__size=7, padding=“same”, strides=2, activation=“relu”<br>),<br>layers.Dropout(rate=0.2),<br>layers.Conv1DTranspose(<br>filters=32, kernel__size=7, padding=“same”, strides=2, activation=“relu”<br>),<br>layers.LSTM(32, return__sequences=True),<br>layers.Conv1DTranspose(filters=1, kernel__size=7, padding=“same”),<br>]<br>)<br>model.compile(optimizer=keras.optimizers.Adam(learning__rate=0.001), loss=“mse”)<br>model.summary( ) | The scheme of prediction model that includes two parts - autoencoder and LSTM. Autoencoder receives the input data and provides its reconstruction. LSTM studies the complex interrelations within the rows of data and extracts features of the dataset finding errors between predicted and real values. |
| history = model.fit(<br>x__train,<br>x__train,<br>epochs=50,<br>batch__size=128,<br>validation__split=0.1,<br>callbacks=[<br>keras.callbacks.EarlyStopping(monitor=“val__loss”, patience=5, mode=“min”)<br>],<br>)<br>plt.plot(history.history[“loss”], label=“Training error”)<br>plt.plot(history.history[“val__loss”], label=“Validation error”)<br>plt.legend( )<br>plt.show( ) | Training of the model using the data |
| x__train__pred = model.predict(x__train)<br>train__mae__loss = np.mean(np.abs(x__train__pred − x__train), axis=1)<br>plt.hist(train__mae__loss, bins=50)<br>plt.xlabel(“MAE Error on Training Data”)<br>plt.ylabel(“Reading”)<br>plt.show( )<br>threshold = np.max(train__mae__loss)<br>print(“reconstruction error threshold: ”, threshold) | Anomaly detection |
| plt.plot(x__train[0])<br>plt.plot(x__train__pred[0])<br>plt.show( ) | Comparison of reconstruction and raw data |
| df__test__value = (df__daily__jumpsup − training__mean) / training__std<br>fig, ax = plt.subplots( )<br>df__test__value.plot(legend=False, ax=ax)<br>plt.show( )<br>x__test = create__sequences(df__test__value.values)<br>print(“Test shape size: ”, x__test.shape) | Preparation of test data |
| x__test__pred = model.predict(x__test)<br>test__mae__loss = np.mean(np.abs(x__test__pred − x__test), axis=1)<br>test__mae__loss = test__mae__loss.reshape((−1))<br>plt.hist(test__mae__loss, bins=50)<br>plt.xlabel(“MAE Error on Test Data.”)<br>plt.ylabel(“Readings”)<br>plt.show( ) | Finding MAE Error on test data. |
| anomalies = test__mae__loss > threshold<br>print(“Number of anomalies detected: ”, np.sum(anomalies)) | Detection of readings with anomalies |

TABLE-continued

| Code | Description |
|---|---|
| print(“Anomalies indices: ”, np.where(anomalies))<br>anomalous__data__indices = [ ]<br>for data__idx in range(TIME__STEPS − 1, len(df__test__value) − TIME__STEPS + 1):<br>if np.all(anomalies[data__idx − TIME__STEPS + 1 : data__idx]):<br>anomalous__data__indices.append(data__idx)<br>df__subset = df__daily__jumpsup.iloc[anomalous__data__indices]<br>fig, ax = plt.subplots( )<br>df__daily__jumpsup.plot(legend=False, ax=ax)<br>df__subset.plot(legend=False, ax=ax, color=“r”)<br>plt.show( )<br>import statistics | |
| Ts__threshold = 100<br>r__threshold = 100<br>ts1 = [500, 520, 510, 540]<br>ts2 = [520, 550, 520, 545]<br>ts3 = [495, 510, 530, 515]<br>ts4 = [505, 495, 520, 515]<br>ts5 = [520, 510, 500, 505]<br>ts6 = [140, 130, 120, 130] # anomalous data<br>ts7 = [540, 530, 500, 495]<br>ts8 = [500, 520, 540, 530]<br>ts9 = [190, 195, 200, 195] # anomalous data<br>ts10 = [510, 500, 510, 500]<br>r1 = [500, 490, 520, 490]<br>r2 = [130, 145, 150, 160] # anomalous data | threshold values for the empirical data collected at the vehicles (ts) and inside the mine site using the environmental sensors (r) |
| def prepare(ts1, ts2, ts3, ts4, ts5, ts6, ts7, ts8, ts9, ts10, r1, r2):<br>ts1__med = statistics.mean(ts1)<br>ts2__med = statistics.mean(ts2)<br>ts3__med = statistics.mean(ts3)<br>ts4__med = statistics.mean(ts4)<br>ts5__med = statistics.mean(ts5)<br>ts6__med = statistics.mean(ts6)<br>ts7__med = statistics.mean(ts7)<br>ts8__med = statistics.mean(ts8)<br>ts9__med = statistics.mean(ts9)<br>ts10__med = statistics.mean(ts10)<br>r1__med = statistics.mean(r1)<br>r2__med = statistics.mean(r2)<br>ts__med__list = [ts1__med, ts2__med, ts3__med, ts4__med, ts5__med, ts6__med, ts7__med, ts8__med, ts9__med, ts10__med]<br>r__med__list = [r1__med, r2__med]<br>return ts__med__list, r__med__list<br>def calculate(ts__medium__list, r__medium__list):<br>ts__medium = statistics.mean(ts__medium__list)<br>r__medium = statistics.mean(r__medium__list)<br>ts__critical__deviation__list = list( )<br>r__critical__deviation__list = list( )<br>for index, ts__i__medium in enumerate(ts__medium__list): | threshold values for the empirical data collected are being averaged |
| ts__deviation = ts__i__medium − ts__medium | deviation of sensor #i from the average of values collected within its group of sensors (on the vehicles)is calculated |
| ts__r__deviation = ts__i__medium − r__medium<br>if abs(ts__deviation) > ts__threshold and abs(ts__r__deviation) > ts__threshold:<br>print(‘sensor ts { }: deviation { } (over the defined threshold { })\n’<br>.format(index+1, ts__deviation, ts__threshold))<br>ts__critical__deviation__list.append(ts__deviation) | deviation of sensor #1 from the average values collected on a cross-validating group of sensors (environmental sensors) |
| # del ts__medium__list[index] | we remove the sensor and recursively call the function |
| ts__medium__list[index] = ts__medium<br>calculate(ts__medium__list, r__medium__list)<br>for index, r__i__medium in enumerate(r__medium__list): | to keep the order of sensors’ data indexing, we replace the value of the removed sensors for the average |
| r__deviation = r__i__medium − r__medium | deviation of sensor #i from the average of values collected within its group of sensors (environmental sensors) |

TABLE-continued

| Code | Description |
|---|---|
| r__ts__deviation = r__i__medium − ts__medium<br>if abs(r__deviation) > r__threshold and abs(r__ts__deviation) > r__threshold:<br>print('sensor room { }: deviation { } (over the threshold { }) \n'<br>.format(index+1, r__deviation, r__threshold))<br>r__critical__deviation__list.append(r__deviation)<br>del r__medium__list[index]<br>r__medium__list[index] =r__medium<br>calculate(ts__medium__list, r__medium__list)<br>return ts__critical__deviation__list, r__critical__deviation__list<br>ts__med__list, r__med__list = prepare(ts1, ts2, ts3, ts4, ts5, ts6, ts7, ts8, ts9, ts10, r1, r2)<br>ts__crit__deviation__list, r__crit__deviation__list = calculate(ts__med__list, r__med__list) | deviation of sensor #1 from the average values collected on a cross-validating group of sensors (on the vehicles)<br>remove the data and recursively call the function |

What is claimed is:

1. A system for greenhouse gas emissions data collection and cross-validation, comprising:

a plurality of vehicle tailpipe emissions sensors installed on light and heavy duty vehicles in underground mine sites;

a plurality of mine site environmental emission sensors;

a plurality of distributed computing data interfaces installed on the vehicles;

a plurality of wireless data transmissions integrated with the data interfaces; and a remote cloud data server and distributed computing cross validation AI algorithm;

wherein the greenhouse gas emission data from the vehicles on the mine site is transmitted to one of the distributed remotely placed computing devices and gets cross-validated against the emission data from site-level environmental emissions sensors using the AI algorithm and the emission data is benchmarked against an acceptability threshold based on the emissions data from similar vehicles continuously accumulated using similar processes at the same mine site and globally, such that when a data anomaly is indicated by the algorithm, the algorithm provides auto-correction and, depending on severity, sends real-time service alerts to the user of the system.

2. The system as claimed in claim 1, wherein the system includes a vehicle in an underground mining site, an onboard data interface installed on the vehicle, emission sensor placed at the tailpipe of the vehicle, environmental emissions sensor and the onsite data interface placed in the underground mine site and through wireless data transmission the emission data is transmitted to the cloud data server from the vehicle on board data interface and the onsite data interface.

3. The system as claimed in claim 1, wherein the system includes the data acquisition module, data analysis module and the sensor data processing module such that the data acquisition module includes the pre collected training data and the time series data but with some anomalies in the data and the data analysis module and the sensor data processing module use AI algorithm.

4. The system as claimed in claim 3, wherein the data analysis module includes pre-processing, model building and training, model evaluation and anomaly detection.

5. The system as claimed in claim 3, data analysis module calculates the particular acceptability threshold by collecting emissions data at predetermined intervals to use as training data.

6. The system as claimed in claim 3, wherein the training data is then processed in a neural network consisting of two layers namely an autoencoder and Long Short-Term Memory (LSTM) such that the autoencoder is used for the reconstruction of data and the removal of anomalies and the Long Short-Term Memory (LSTM) is required to enable the system to work with the larger dataset.

7. The system as claimed in claim 6, wherein when the emission data from the tailpipe emissions sensors and the environmental emissions sensors is fed into the autoencoder, the autoencoder, by mimicking input data, reconstructs the normal emissions pattern and deviations from this pattern, such as the observed spike, are then flagged as anomalies.

8. The system as claimed in claim 6, wherein the Long Short-Term Memory (LSTM) is a recurrent neural network type that processes the substantial emissions data and discerns patterns over time that is crucial for analyzing inherently time-dependent emission data.

9. The system as claimed in claim 3, wherein the sensor data processing stage of the cross validation process comprises the steps of:

a) the tailpipe emission sensors that are installed on the plurality of vehicles collect emission data at pre-determined intervals;

b) the data collected on each tailpipe emission sensor and each environmental emission sensor gets averaged separately for each sensor;

c) the averages calculated in step b) are averaged relative to each other;

d) the calculation result of step c) is then deducted from the calculation results of step b), separately for each sensor;

e) the difference between two averages in step d) is then benchmarked against the particular acceptability threshold;

f) when, for a particular sensor, the difference exceeds the acceptability threshold, the respective sensor and the vehicle on which it is installed are indicated by the algorithm as at-risk and red-flagged; and g) corrective measures, including taking equipment for maintenance or feedback to equipment operator, can then be carried out by the individual/equipment operator in charge at the mine stie or at a remote location.

* * * * *